(12) United States Patent
Pursifull et al.

(10) Patent No.: US 10,677,196 B2
(45) Date of Patent: Jun. 9, 2020

(54) METHOD FOR INCREASING VACUUM PRODUCTION FOR A VEHICLE

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 14/269,954

(22) Filed: May 5, 2014

(65) Prior Publication Data

US 2015/0316002 A1   Nov. 5, 2015

(51) Int. Cl.
| | | |
|---|---|---|
| F02M 3/00 | (2006.01) | |
| F02D 41/30 | (2006.01) | |
| F02M 35/10 | (2006.01) | |
| F02D 41/14 | (2006.01) | |
| F02D 13/02 | (2006.01) | |
| F02D 41/08 | (2006.01) | |
| F02D 9/02 | (2006.01) | |

(52) U.S. Cl.
CPC ......... *F02M 3/005* (2013.01); *F02D 13/0207* (2013.01); *F02D 41/08* (2013.01); *F02D 41/1475* (2013.01); *F02D 41/3017* (2013.01); *F02M 35/10229* (2013.01); *F02D 13/0265* (2013.01); *F02D 2009/024* (2013.01); *F02D 2200/703* (2013.01); *F02D 2250/41* (2013.01); *Y02T 10/18* (2013.01)

(58) Field of Classification Search
CPC .. F02D 13/0207; F02D 41/08; F02D 41/1475; F02D 41/3017; F02D 2009/024; F02M 3/005; F02M 35/10229

USPC ............... 123/339.12, 339.11, 389, 406.67
See application file for complete search history.

(56) References Cited

U.S. PATENT DOCUMENTS

| | | | | |
|---|---|---|---|---|
| 4,598,678 A | * | 7/1986 | Kobayashi | F02B 31/08 123/188.14 |
| 4,681,078 A | * | 7/1987 | Noguchi | F02M 23/04 123/490 |
| 5,894,828 A | * | 4/1999 | Sivashankar | F02D 41/1406 123/339.11 |
| 5,950,595 A | | 9/1999 | Yoshioka et al. | |
| 6,305,757 B1 | | 10/2001 | Ohsaki et al. | |
| 6,412,883 B1 | | 7/2002 | Mizutani et al. | |

(Continued)

FOREIGN PATENT DOCUMENTS

| | | |
|---|---|---|
| CN | 102094720 A | 6/2011 |
| CN | 102900544 A | 1/2013 |
| EP | 1065364 A1 | 1/2001 |

OTHER PUBLICATIONS

Cunningham, Ralph W. et al., "Method and System for an Engine for Detection and Mitigation of Insufficient Torque," U.S. Appl. No. 13/939,104, filed Jul. 10, 2013, 50 pages.

(Continued)

*Primary Examiner* — Lindsay M Low
*Assistant Examiner* — Omar Morales
(74) *Attorney, Agent, or Firm* — Geoffrey Brumbaugh McCoy Russell LLP (57) ABSTRACT

Methods and systems for providing vacuum to a vehicle are described. In one example, a method adjusts an engine air-fuel ratio in response to provide additional vacuum to the vehicle.

20 Claims, 4 Drawing Sheets

(56) References Cited

U.S. PATENT DOCUMENTS

| | | | | |
|---|---|---|---|---|
| 6,664,651 B1* | 12/2003 | Kotre | ............... | B60K 6/365 |
| | | | | 180/65.245 |
| 7,739,005 B1 | 6/2010 | Tang | | |
| 7,742,852 B1 | 6/2010 | Tang | | |
| 7,747,363 B1 | 6/2010 | Tang | | |
| 8,355,856 B2 | 1/2013 | Hartrey et al. | | |
| 2004/0144360 A1* | 7/2004 | Surnilla | ............. | F02D 37/02 |
| | | | | 123/339.11 |
| 2010/0036564 A1 | 2/2010 | Blaise et al. | | |
| 2011/0041458 A1 | 2/2011 | Yu Chen | | |
| 2012/0237366 A1* | 9/2012 | Pursifull | ............ | F04B 49/03 |
| | | | | 417/54 |
| 2012/0237367 A1* | 9/2012 | Cunningham | ............ | F04F 5/20 |
| | | | | 417/55 |
| 2012/0285421 A1* | 11/2012 | Cunningham | ......... | B60T 17/02 |
| | | | | 123/436 |
| 2012/0316751 A1 | 12/2012 | Eastwood et al. | | |
| 2012/0323401 A1 | 12/2012 | McGrogan | | |

OTHER PUBLICATIONS

Pursifull, Ross D. et al., "Method and System for Increasing Vacuum Generation by an Engine," U.S. Appl. No. 13/944,728, filed Jul. 17, 2013, 42 pages.

State Intellectual Property Office of the People's Republic of China, Office Action and Search Report Issued in Application No. 201510220667.7, Jan. 24, 2019, 12 pages. (Submitted with Partial Translation).

* cited by examiner

METHOD FOR INCREASING VACUUM PRODUCTION FOR A VEHICLE

FIELD

The present description relates to methods and systems for operating an engine that produces vacuum for a vehicle. The methods and systems may be particularly useful for engines that are operated at higher altitudes.

BACKGROUND AND SUMMARY

Vehicle engine displacement may be reduced to conserve fuel and reduce engine emissions. A driver may request similar torque amounts from a small engine as from a larger engine under similar operating conditions. The smaller engine may operate at a higher intake manifold pressure to produce a same amount of torque produced by a larger engine operating at a lower intake manifold pressure. As a result, the larger engine may operate with intake manifold pressure that is lower than atmospheric pressure more frequently than the smaller engine during similar operating conditions. The lower intake manifold pressures, or higher intake vacuum, produced by the larger engine may allow the larger engine to provide more vacuum to vehicle systems that operate with vacuum (e.g., brakes, HVAC vents, etc.). The smaller engine may produce sufficient vacuum at higher barometric pressures (e.g., at lower altitudes), but it may struggle to provide a desired amount of vacuum at higher altitudes where less oxygen concentration may be available.

The inventors herein have recognized the above-mentioned disadvantages and have developed a method for operating an engine, comprising: operating an engine at idle speed with a homogeneous air-fuel mixture; and richening the homogeneous air-fuel mixture and reducing an engine air flow amount to maintain the engine at idle speed in response to a request for vacuum.

By richening an air-fuel ratio provided to an engine in response to a request for vacuum, it may be possible to provide the technical result of generating additional vacuum within an engine during operating conditions that may not be conducive to generating vacuum. For example, if an engine is idling at a higher altitude and a request for vacuum is provided in response to a low level of stored vacuum, the engine air-fuel ratio may be richened so that the engine provides the same torque as before the engine air-fuel ratio was richened with a lower engine air flow amount. By lowering the amount of air flowing through the engine, the engine may increase a vacuum level of an intake manifold so that the stored vacuum amount may be increased.

The present description may provide several advantages. Specifically, the approach may allow an engine to produce additional vacuum at higher altitudes. Further, the approach may provide additional vacuum without increasing system cost. Additionally, the approach may increase vacuum production without increasing engine emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
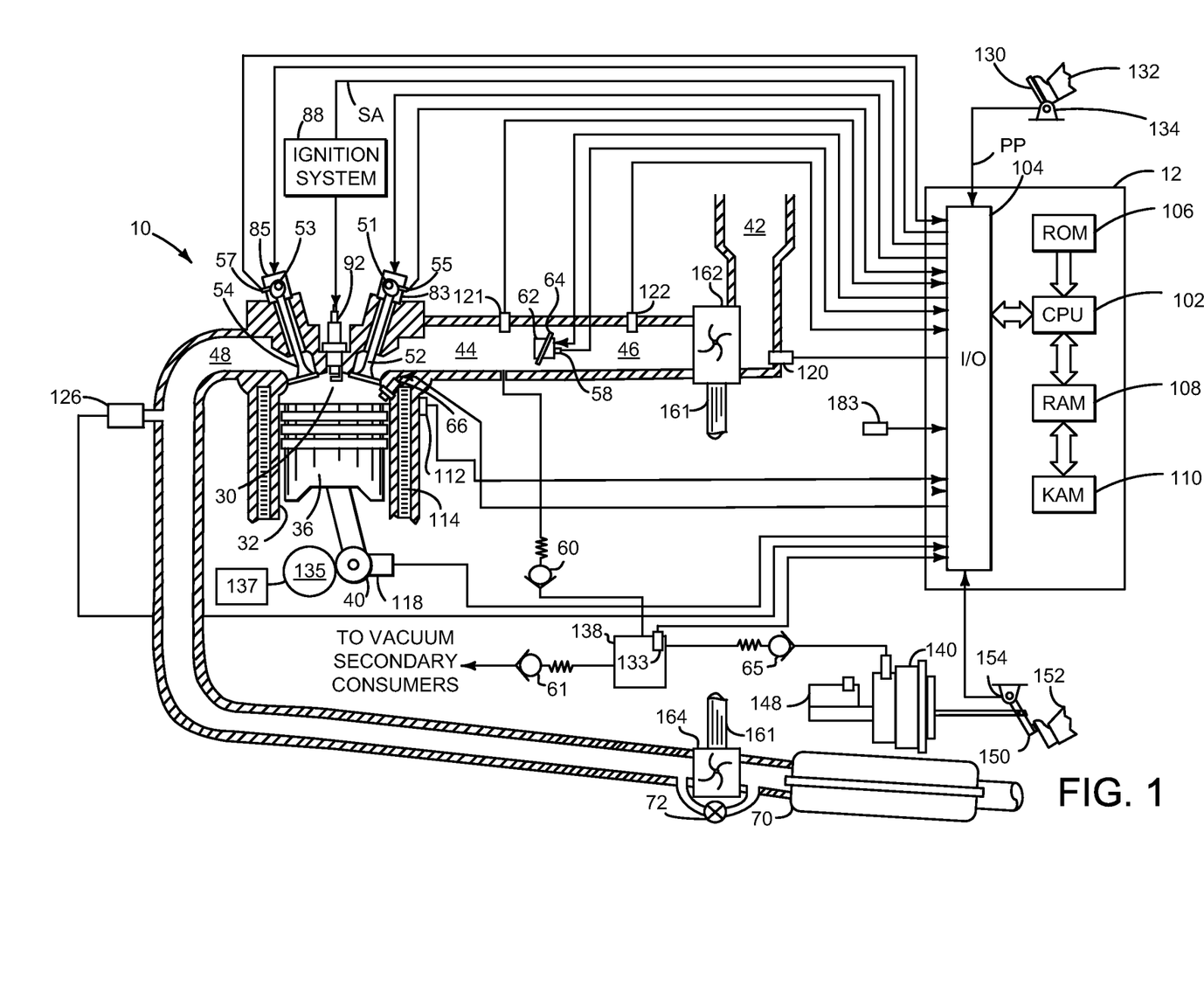
FIG. 1 is a schematic diagram of an engine.
Figure 2:
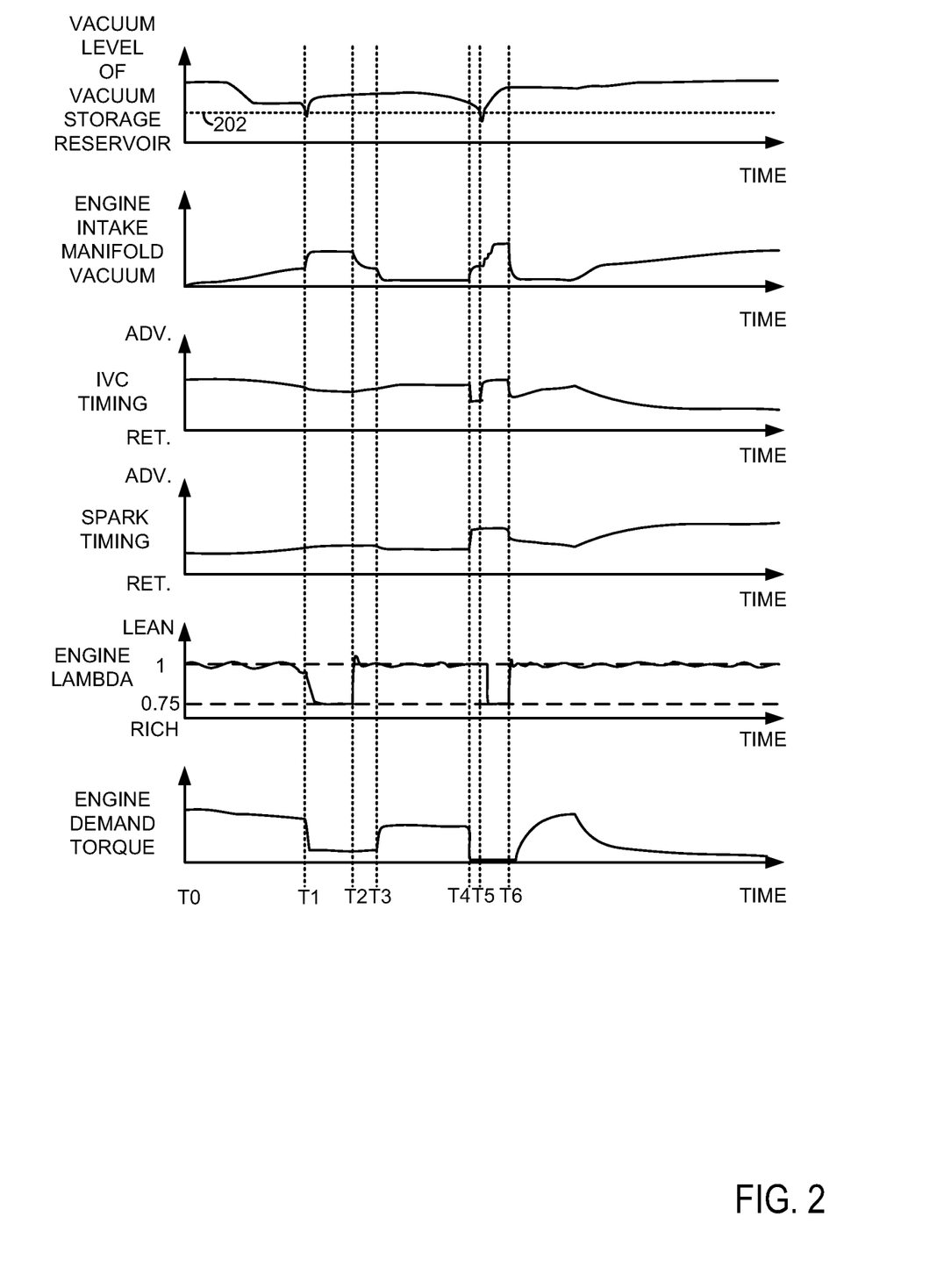
FIG. 2 is a plot of an example engine operating sequence.

The present description is related to providing vacuum for vacuum consumers of a vehicle. In one non-limiting example, an engine as illustrated in FIG. 1 may be a source for generating vacuum used throughout the vehicle. FIG. 2 shows an example engine operating sequence according to the method of FIGS. 3 and 4. Vacuum may be provided to vacuum consumers of a vehicle according to the method of FIGS. 3 and 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve adjustment device 83 adjusts the opening time, closing time, and lift of intake valve 52 relative to a position of crankshaft 40. Exhaust valve adjustment device 85 adjusts the opening time, closing time, and lift of exhaust valve 54 relative to a position of crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of a signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Vacuum is supplied to waste gate actuator 72 via vacuum reservoir 138. Vacuum reservoir 138 may be supplied vacuum from intake manifold 44 via check valve 60.

Vacuum reservoir 138 provides vacuum to brake booster 140 via check valve 65. Vacuum reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from vacuum reservoir 138 to secondary vacuum consumers (e.g., vacuum consumers other than the vehicle braking system). Brake booster 140 may include an internal vacuum reservoir, and it may amplify force provided by foot 152 via brake pedal 150 to master cylinder 148 for applying vehicle brakes (not shown). The invented system is compatible with systems that enhance vacuum with aspirators (and the like), spark advance toward MBT, cam adjustments toward best intake vacuum, FEAD load shedding, torque converter load shedding via neutral idle, torque converter load shedding via lower idle speeds in gear.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Converter 70 can include multiple catalyst bricks, in one example. In another example, multiple emission control devices, each with multiple bricks, can be used. Converter 70 can be a three-way type catalyst in one example.

Alternator 135 is mechanically coupled to crankshaft 135 and it provides electrical energy to operate electrical loads 137. Electrical loads 137 may include but are not limited to vehicle lights, window defrosting tape, electrical motors, and electrical actuators. Controller 12 may selectively activate and deactivate electrical loads 137.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed via sensor 183 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a system for operating an engine, comprising: an engine; a vacuum storage reservoir including a vacuum sensor; and a controller including executable instructions stored in a non-transitory medium to richen an air-fuel mixture supplied to the engine in response to a vacuum level of the vacuum storage reservoir being less than a threshold level. The system further comprises an intake valve adjustment device coupled to the engine and additional instructions for advancing intake valve timing via the intake valve adjustment device in response to the vacuum level of the vacuum storage reservoir being less than the threshold level.

In some examples, the system further comprises an alternator coupled to the engine and additional instructions for reducing a load of the alternator applied to the engine in response to the vacuum level of the vacuum storage reservoir being less than the threshold level. The system further comprises additional instructions for supplying a lean air-fuel ratio to the engine in response to a torque level of the engine being greater than a threshold while the vacuum level of the vacuum storage reservoir is less than the threshold level. The system further comprises additional instructions for supplying a lean air-fuel ratio to the engine in response to an intake manifold vacuum being within a desired vacuum level of the a threshold vacuum. The system further comprises additional instructions to lean the air-fuel mixture to a stoichiometric air-fuel mixture in response to a state of a catalyst.

Figure 3:
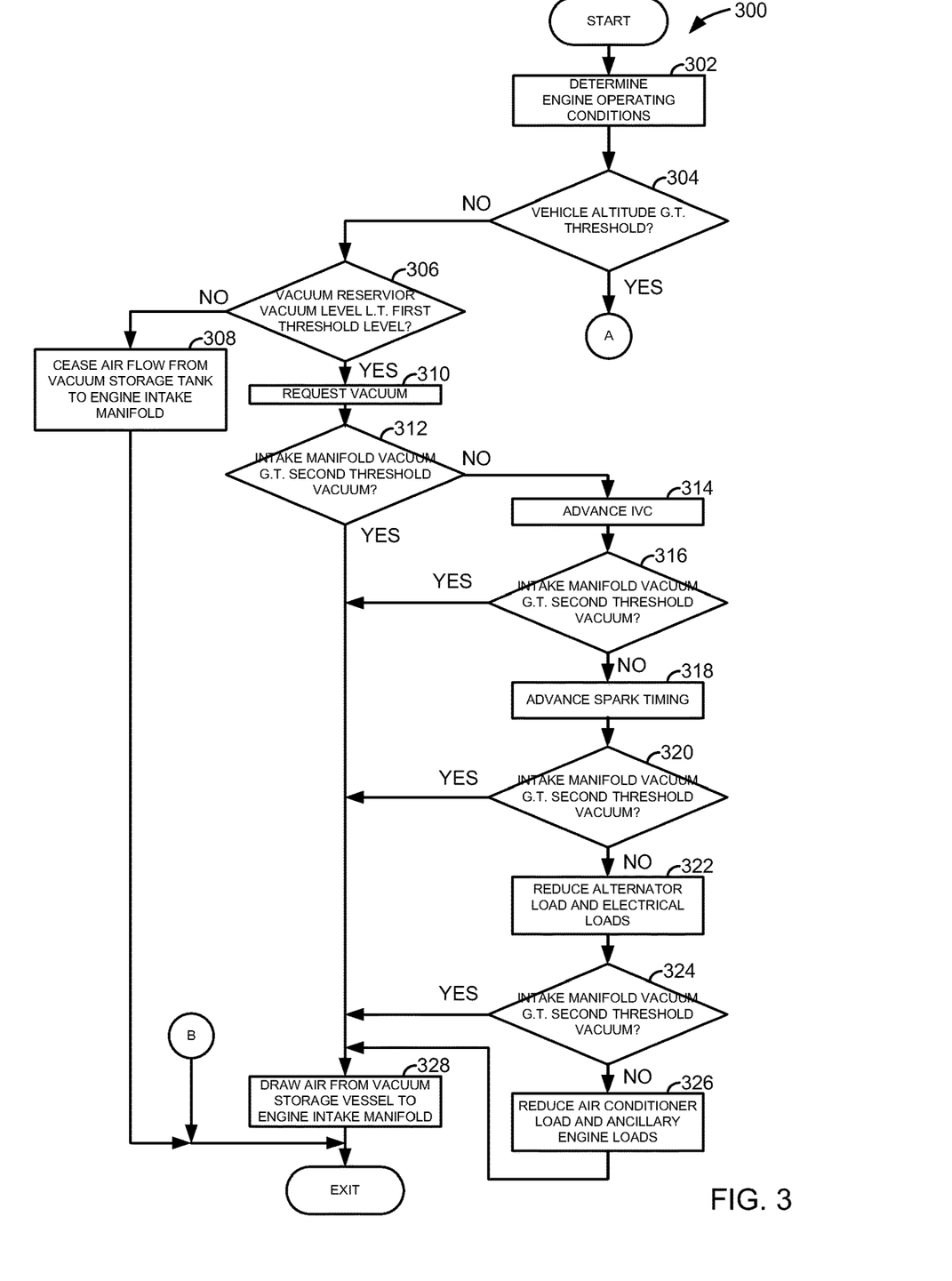
FIGS. 3 and 4 are a flowchart of an example engine control method for increasing vacuum production.
Figure 4:
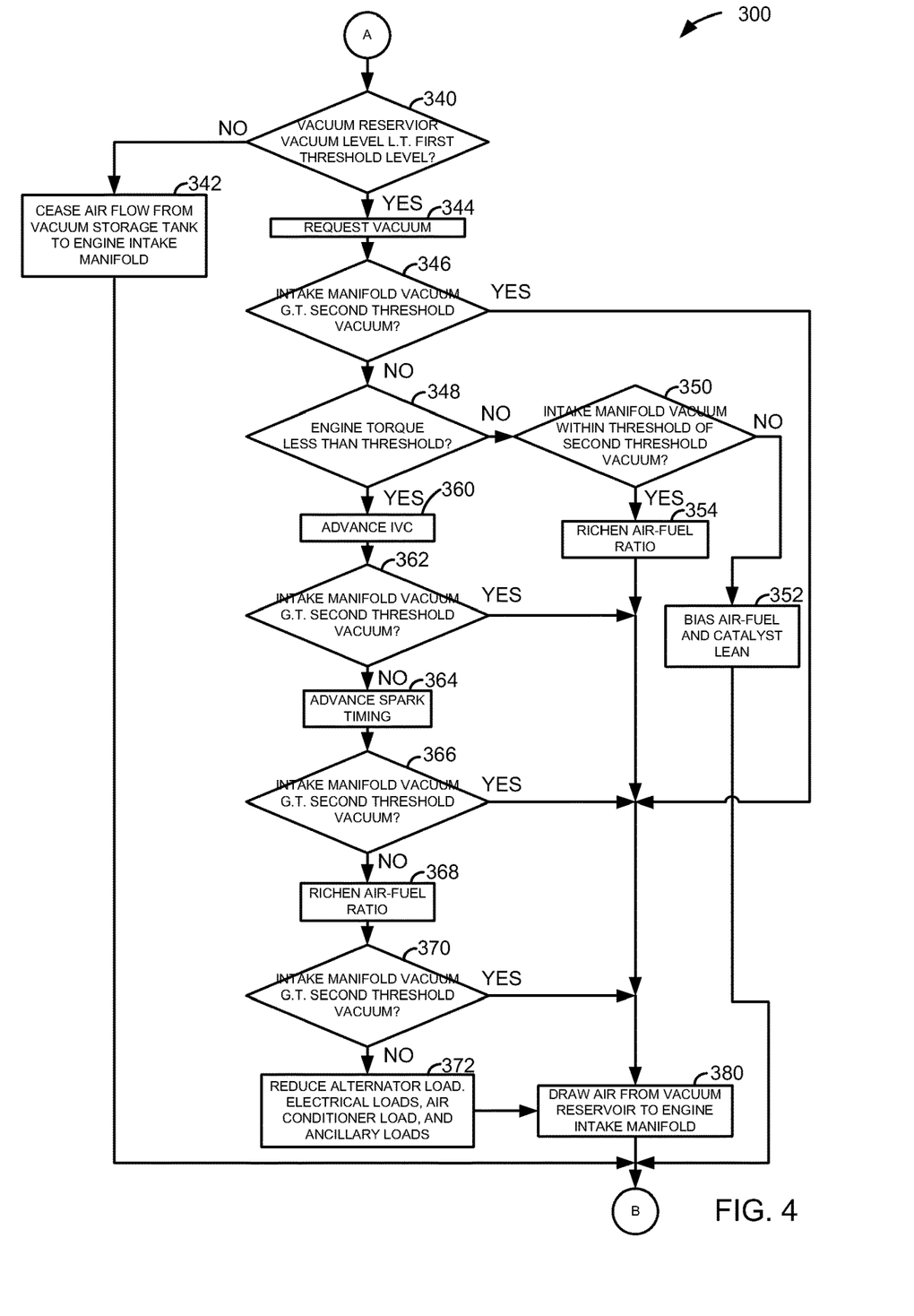

Referring now to FIG. 2, a plot of an engine operating sequence according to the method of FIGS. 3 and 4 is shown. The engine operating sequence may be provided by the system of FIG. 1. Vertical markers T0-T6 represent times of interest during the sequence.

It should be understood that there may be a number of intake vacuum increasing actions that may be deployed before, during, or after the newly invented vacuum-increasing action of going rich. Additionally, spark timing is not retarded in response to richening the engine air-fuel mixture to provide increased vacuum. Rather, spark timing during enrichment is at a same level of spark advance relative to MBT before enrichment. Vacuum increasing actions may include: 1) opening a valve that allows flow through an aspirator (or a like device) 2) moving the intake and exhaust cams to a position that gives best intake vacuum 3) advancing ignition timing toward MBT 4) shedding electrical loads 5) reducing alternator output 6) reducing AC torque (e.g. disengage the clutch) 7) reducing torque converter power consumption via reducing idle speed in gear 8) reducing torque converter power consumption via going fully or partially toward what is effectively neutral idle, 9) turn off EGR, 10) turn off fuel vapor purge, 11) turn off crankcase ventilation.

The first plot from the top of FIG. 2 is a plot of vacuum level in a vacuum storage reservoir or tank versus time. The vacuum level increases in the direction of the Y axis arrow and pressure in the vacuum storage reservoir is reduced as the vacuum level increases. The X axis represents time and time increases from the left side of FIG. 2 to the right side of FIG. 2. Horizontal line 202 represents a threshold level of vacuum stored in the vacuum reservoir. When the level of vacuum stored in the vacuum reservoir is below threshold level 202, a request for vacuum is provided.

The second plot from the top of FIG. 2 is a plot of engine intake manifold vacuum versus time. The engine intake manifold vacuum increases in the direction of the Y axis arrow and pressure in the engine intake manifold is reduced as the engine intake manifold vacuum level increases. The X axis represents time and time increases from the left side of FIG. 2 to the right side of FIG. 2.

The third plot from the top of FIG. 2 is a plot of engine intake valve closing (IVC) timing versus time. In this example, IVC occurs between BDC compression stroke and TDC compression stroke. Therefore, IVC advances toward BDC compression stroke and is retarded toward TDC compression stroke. The X axis represents time and time increases from the left side of FIG. 2 to the right side of FIG. 2.

The fourth plot from the top of FIG. 2 is a plot of engine spark timing versus time. The engine spark timing is advanced when the trace moves in the direction of the Y axis arrow and is retarded when the trance moves toward the X axis. The X axis represents time and time increases from the left side of FIG. 2 to the right side of FIG. 2.

The fifth plot from the top of FIG. 2 is a plot of engine lambda versus time. Lambda is the engine's present air-fuel ratio divided by the stoichiometric air-fuel ratio. Thus, a value of 1 indicates the engine air-fuel ratio is the stoichiometric air-fuel ratio, a valve of less than one indicates the engine is supplied a rich air-fuel ratio, and a value greater than one indicates the engine is supplied a lean air-fuel ratio. Horizontal lines are provided at lambda equals one and lambda equals 0.75 for reference. The engine lambda becomes leaner in the direction of the Y axis arrow and richer toward the X axis. The X axis represents time and time increases from the left side of FIG. 2 to the right side of FIG. 2.

The sixth plot from the top of FIG. 2 is a plot of engine demand torque versus time. The engine demand torque increases in the direction of the Y axis arrow and decreases in the direction of the X axis. The X axis represents time and time increases from the left side of FIG. 2 to the right side of FIG. 2.

The sequence of FIG. 2 represents a simulated engine operating sequence according to the method of FIGS. 3 and 4 when an engine is operated at an altitude greater than a threshold altitude. Engine operation at an altitude less than the threshold altitude is not shown in this example.

At time T0, the vacuum level in the vacuum reservoir is at a higher level and engine intake vacuum is at a lower level indicating that the engine is operating at a higher engine load. IVC is advanced and spark timing is slightly retarded. The engine is operated at a lambda value of 1 to improve catalyst efficiency and demand torque is at a middle level.

Between time T0 and time T1, the vacuum level in the vacuum storage reservoir is decreased. The vacuum level in the vacuum storage reservoir may be decreased via vacuum consumers, such as the brake booster, that use vacuum and release air into the vacuum reservoir. The engine intake manifold vacuum increases slightly as the engine demand torque is reduced since less air is consumed by the engine to provide the lower torque. The IVC timing is slightly retarded and spark timing is slightly advanced in response to engine speed (not shown) and lower engine torque. The engine lambda value remains at a value of one.

At time T1, the vacuum level of the vacuum storage reservoir is less than level 204 and the intake manifold vacuum is within a threshold vacuum of level 204. The engine demand torque is at a lower level, but not at idle conditions. The engine lambda value is transitioned to 0.75 to richen the engine air-fuel ratio in response to a vacuum request and intake manifold vacuum being within a threshold vacuum of vacuum level 202. The vacuum request is generated in response to the vacuum level in the vacuum reservoir being less than vacuum level 202.

By richening the engine air-fuel ratio, the engine may produce the requisite engine torque (e.g., driver demand torque), but with less air consumption. The lowered air consumption results in an increased intake manifold vacuum. The engine demand torque may be produced with the additional fuel and via reducing the amount of air supplied to the engine. The engine intake manifold vacuum increases as the engine air amount flowing into the engine is reduced in response to richening the engine air-fuel ratio or the increase in engine torque. The IVC timing is slightly retarded and the spark timing is slightly advanced according to their base values (e.g., empirically determined and stored in a table and indexed via engine speed and torque). The increasing engine intake vacuum allows the engine to increase vacuum in the vacuum reservoir by drawing air from the vacuum reservoir into the engine.

At time T2, the vacuum level of the vacuum reservoir is increased to a level greater than level 202 by a threshold amount. Consequently, engine lambda is increased (leaned) from 0.75 to 1 in response to the amount of stored vacuum being greater than level 202. The IVC timing is advanced a small amount and the spark timing is slightly retarded. The engine demand torque remains the same as when the air-fuel ratio was richened.

At time T3, the engine demand torque increases in response to a driver applying an accelerator pedal. The intake manifold vacuum decreases and IVC timing is advanced in response to the increase in engine demand torque. Also, spark timing is retarded in response to the increase in engine demand torque. The engine operates with an air-fuel mixture having a value of lambda equal one. The vacuum level in the vacuum reservoir remains is reduced near time T4 in response to a low level of vehicle brake application.

At time T4, the engine demand torque decreases in response to a driver releasing an accelerator pedal. The engine begins to operate at idle conditions (e.g., idle speed and torque). Spark timing is advanced and IVC timing is retarded in response to the engine entering idle conditions. The intake manifold vacuum increases but it is insufficient to produce additional vacuum in the vacuum reservoir.

Shortly thereafter at time T5, the vacuum level of the vacuum reservoir is decreased in response to a driver further applying vehicle brakes. The vacuum level of the vacuum reservoir is reduced to a level less than level 202; therefore, a vacuum request is provided. IVC timing is advanced and spark timing is held steady. The change in IVC timing does not provide the desired increase in engine intake manifold vacuum. Subsequently, the engine air-fuel ratio is richened to operate the engine at 0.75 lambda. Richening the air-fuel mixture supplied to the engine allows the engine to produce the requisite torque at a lower engine air flow rate, thereby increasing engine intake manifold vacuum. The increase in engine intake manifold vacuum allows air to be drawn from the vacuum storage reservoir to increase vacuum in the vacuum storage reservoir.

At time T6, the vacuum level in the vacuum reservoir is increased to a level greater than level 202 plus a threshold amount of vacuum. The engine air-fuel ratio is leaned so that the engine operates with a lambda value of one. IVC is retarded and spark timing is held constant. Consequently, the engine intake vacuum is reduced. The engine demand torque remains at a low level and the engine remains operating at a higher altitude.

After time T6, there are no additional requests for vacuum and the engine is operated with a stoichiometric air-fuel mixture. Intake manifold pressure and torque follow driver demand torque.

Referring now to FIGS. 3 and 4, a flowchart of an example engine control method for increasing vacuum production is shown. The method of FIGS. 3 and 4 may be included as executable instructions stored in non-transitory memory. Additionally, the method of FIGS. 3 and 4 may provide the operating sequence shown in FIG. 2.

At 302, method 300 determines engine operating conditions. Engine operating conditions may include engine speed, engine torque, engine temperature, ambient temperature, barometric pressure, intake manifold pressure, and air-fuel ratio. Method 300 proceeds to 304 after engine operating conditions are determined.

At 304, method 300 judges if altitude of the vehicle in which the engine operates is greater than a threshold altitude. The threshold altitude may vary for different engines, vehicle mass, and other operating parameters. If method 300 judges that the vehicle altitude is greater than a threshold, the answer is yes and method 300 proceeds to 340 of FIG. 4. Otherwise, the answer is no and method 300 proceeds to 306.

Additionally, barometric pressure may be a surrogate for altitude. Therefore, if barometric pressure is less than a threshold pressure, the answer is yes and method 300 proceeds to 340. Otherwise, the answer is no and method 300 proceeds to 306.

At 340, method 300 judges if a vacuum level (e.g., 50 kPa) in the vacuum storage reservoir is less than (L.T.) a first threshold vacuum level. The first threshold vacuum level may vary with vehicle operating conditions, such as altitude and ambient temperature. In one example, method 300 determines the vacuum level in the vacuum storage reservoir based on output of a pressure sensor. If method 300 judges that the vacuum level in the vacuum storage reservoir is less than the first threshold level, the answer is yes and method 300 proceeds to 344. Otherwise, the answer is no and method 300 proceeds to 342.

At 342, method 300 ceases air flow from the vacuum storage reservoir to the engine intake manifold vacuum. In one example, a check valve limits air flow from the vacuum storage reservoir to the engine intake manifold when vacuum level in the intake manifold is less than a vacuum level in the vacuum reservoir. However, if vacuum level in the engine intake manifold is greater than vacuum level in the vacuum reservoir, air may be allowed to flow from the vacuum reservoir to the engine intake manifold. Alternatively, a solenoid valve may be closed to prevent pneumatic communication between the engine intake manifold and the vacuum reservoir. Further, the engine is operated with a stoichiometric homogeneous air-fuel mixture. Method 300 proceeds to exit after air flow from the vacuum reservoir to the engine intake manifold ceases.

At 344, method 300 requests additional vacuum be produced for the vacuum reservoir. Thus, a request for vacuum may be based on the amount of vacuum stored in the vacuum reservoir being less than a threshold amount of vacuum. Method 300 proceeds to 346 after a vacuum request is provided.

At 346, method 300 judges if intake manifold vacuum is greater than (G.T.) a second threshold vacuum. The second threshold vacuum may be greater than the first threshold vacuum. Note that a greater or increased vacuum corresponds to a lower pressure. Intake manifold vacuum may be determined via an intake manifold pressure sensor. If method 300 judges that intake manifold vacuum is greater than the second threshold vacuum, the answer is yes and method 300 proceeds to 380. Otherwise, the answer is no and method 300 proceeds to 348.

At 348, method 300 judges if engine torque is less than a threshold torque. In one example, the threshold torque may be engine torque at engine idle conditions. Further, in some examples, method 300 may require engine speed be below a threshold speed (e.g., being at idle speed) for an answer of yes allowing method 300 to proceed to 360. If method 300 judges that engine torque is less than a threshold, the answer is yes and method 300 proceeds to 360. Otherwise, the answer is no and method 300 proceeds to 350.

At 350, method 300 judges if engine intake manifold vacuum is within a threshold vacuum of the second threshold vacuum (e.g., within 3 kPa of vacuum). If method 300 judges that engine intake manifold vacuum is within the threshold vacuum of the second vacuum described at 345, the answer is yes and method 300 proceeds to 354. Otherwise, the answer is no and method 300 proceeds to 352.

At 352, method 300 biases the engine air-fuel ratio lean and a catalyst in the engine's exhaust system lean. In one example, the catalyst is adjusted to a state where greater than sixty percent of available oxygen storage sites of the catalyst are utilized storing oxygen. Biasing the catalyst to a lean state may allow the engine to operate rich for a longer period of time when the engine is operating rich to produce additional vacuum. Method 300 proceeds to exit after the engine air-fuel ratio and catalyst are biased lean.

At 354, method 300 richens the engine air-fuel ratio to operate the engine at a lambda value of 0.8 or less. In some examples, the engine is operated at rich conditions where engine torque is maintained while engine air consumption is reduced by 12% at a same spark timing as when the engine is operated at the same torque with a stoichiometric air-fuel ratio. In other words, the desired engine torque may be maintained from conditions where the engine is operated with a stoichiometric air-fuel ratio and spark timing (e.g., MBT spark timing) to conditions where the engine is operated with a rich air-fuel ratio, same spark timing, and 12% less air. Thus, by operating the engine at a rich air-fuel ratio, it may be possible for the engine to produce the demanded engine torque with less air flowing into the engine, thereby increasing intake manifold vacuum. Thus, the engine air flow rate may also be reduced at 354 and engine speed may be maintained (e.g., at idle speed). The richened engine air-fuel mixture is a homogeneous mixture. Method 300 proceeds to 380 after the engine air fuel ratio is richened from a stoichiometric air-fuel ratio.

However, if a state of a catalyst in the engine's exhaust system is richer than desired (e.g. 75% of available oxygen storage sites are not occupied by oxygen), method 300 may return to operating the engine at stoichiometric conditions, or the engine may operate lean for a period of time to ensure higher catalyst efficiency. Thus, method 300 may vary engine air-fuel ratio control between being richer than stoichiometry (e.g., 0.8 lambda) or lean of stoichiometry to improve catalyst efficiency while generating vacuum. The vacuum generation period for brake vacuum replenishment may be less than one second. Thus, one can run lean after running rich to improve catalyst efficiency during vacuum regeneration.

At 380, method 300 draws air from the vacuum reservoir into the engine to increase vacuum in the vacuum reservoir. In system configurations where a check valve is placed between the engine intake manifold and the vacuum reservoir, the check valve may open automatically when vacuum in the engine intake manifold exceeds vacuum in the vacuum reservoir. Method 300 proceeds to exit after air is drawn from the vacuum reservoir to the engine intake manifold.

At 360, method 300 advances IVC timing of engine cylinders toward BDC intake stroke to increase the engine's volumetric efficiency. By increasing the engine's volumetric efficiency, the engine may operate with lower intake manifold pressure or higher vacuum. Thus, IVC may be advanced to increase the engine's vacuum production capacity. Method 300 proceeds to 362 after IVC timing is advanced.

At 362, method 300 judges if engine intake manifold vacuum is greater than the second threshold vacuum described at 346. If method 300 judges that engine intake manifold vacuum is greater than the second threshold vacuum, the answer is yes and method 300 proceeds to 380. Otherwise, the answer is no and method 300 proceeds to 364.

At 364, method 300 advance engine spark timing toward minimum spark for best torque (MBT) spark timing. By advancing spark timing, the engine may produce additional torque with inducting less air. Advancing the spark timing reduces the engine's torque reserve and may leave less engine torque available if an unanticipated torque is applied to the engine. Method 300 proceeds to 366 after engine spark timing is advanced.

At 366, method 300 judges if engine intake manifold vacuum is greater than the second threshold vacuum described at 346. If method 300 judges that engine intake manifold vacuum is greater than the second threshold vacuum, the answer is yes and method 300 proceeds to 380. Otherwise, the answer is no and method 300 proceeds to 368.

At 368, method 300 richens an air-fuel mixture supplied to the engine. By enriching the engine air-fuel ratio, the engine may produce the requisite torque while inducting less air as compared to similar conditions where the engine is operated with a stoichiometric air-fuel ratio. Thus, the engine air flow rate may also be reduced at 368 and engine speed may be maintained (e.g., at idle speed). In one example, the engine may be operated at a lambda value of 0.8 or richer to increase engine torque. The richened engine air-fuel mixture is a homogeneous mixture. Method 300 proceeds to 370 after the engine's air-fuel ratio is richened.

However, if a state of a catalyst in the engine's exhaust system is richer than desired (e.g. 75% of available oxygen storage sites are not occupied by oxygen), method 300 may return to operating the engine at stoichiometric conditions, or the engine may operate lean for a period of time to ensure higher catalyst efficiency. Thus, method 300 may vary engine air-fuel ratio control between being richer than stoichiometry (e.g., 0.8 lambda) or lean of stoichiometry to improve catalyst efficiency while generating vacuum.

At 370, method 300 judges if engine intake manifold vacuum is greater than the second threshold vacuum described at 346. If method 300 judges that engine intake manifold vacuum is greater than the second threshold vacuum, the answer is yes and method 300 proceeds to 380. Otherwise, the answer is no and method 300 proceeds to 372.

At 372, method 300 sheds the alternator load from the engine, air conditioner load from the engine, and or the ancillary engine loads to reduce torque applied to the engine so that the engine may continue to operate at its desired speed (e.g., idle speed). By reducing loads applied to the engine, it may be possible to operate the engine at its desired speed with a lower engine air flow rate so that additional vacuum is produced. Method 300 proceeds to 380 after engine loads are shed.

Thus, method 300 may richen an engine air-fuel ratio when an engine is operated above a threshold altitude. Further, richening the engine air-fuel ratio may be included in an order of actions taken to increase engine intake manifold vacuum when the vehicle is operated at altitude. During some conditions when engine torque is greater than engine torque at idle conditions, the engine air-fuel ratio may be richened in response to a request for vacuum when vacuum in the engine intake manifold is within a threshold vacuum level so that additional vacuum may be provided by the engine at off idle conditions.

At 306, method 300 judges if a vacuum level (e.g., 50 kPa) in the vacuum storage reservoir is less than (L.T.) a first threshold vacuum level. The first threshold vacuum level may vary with vehicle operating conditions, such as altitude and ambient temperature. If method 300 judges that the vacuum level in the vacuum storage reservoir is less than the first threshold level, the answer is yes and method 300 proceeds to 310. Otherwise, the answer is no and method 300 proceeds to 308.

At 308, method 300 ceases air flow from the vacuum storage reservoir to the engine intake manifold vacuum. In one example, a check valve limits air flow from the vacuum storage reservoir to the engine intake manifold when vacuum level in the intake manifold is less than a vacuum level in the vacuum reservoir. However, if vacuum level in the engine intake manifold is greater than vacuum level in the vacuum reservoir, air may be allowed to flow from the vacuum reservoir to the engine intake manifold. Alternatively, a solenoid valve may be closed to prevent pneumatic communication between the engine intake manifold and the vacuum reservoir. Further, the engine is operated with a stoichiometric homogeneous air-fuel mixture. Method 300 proceeds to exit after air flow from the vacuum reservoir to the engine intake manifold ceases.

At 310, method 300 requests additional vacuum be produced for the vacuum reservoir. Thus, a request for vacuum may be based on the amount of vacuum stored in the vacuum reservoir being less than a threshold amount of vacuum. Method 300 proceeds to 312 after a vacuum request is provided.

At 312, method 300 judges if intake manifold vacuum is greater than (G.T.) a second threshold vacuum. The second threshold vacuum may be greater than the first threshold vacuum. Intake manifold vacuum may be determined via an intake manifold pressure sensor. If method 300 judges that intake manifold vacuum is greater than the second threshold vacuum (e.g. 34 kPa), the answer is yes and method 300 proceeds to 328. Otherwise, the answer is no and method 300 proceeds to 314.

At 314, method 300 advances IVC timing of engine cylinders toward BDC intake stroke to increase the engine's volumetric efficiency. By increasing the engine's volumetric efficiency, the engine may operate with lower intake manifold pressure or higher vacuum. Thus, IVC may be advanced to increase the engine's vacuum production capacity. Method 300 proceeds to 316 after IVC timing is advanced.

At 316, method 300 judges if engine intake manifold vacuum is greater than the second threshold vacuum described at 312. If method 300 judges that engine intake manifold vacuum is greater than the second threshold vacuum, the answer is yes and method 300 proceeds to 328. Otherwise, the answer is no and method 300 proceeds to 318.

At 318, method 300 advance engine spark timing toward minimum spark for best torque (MBT) spark timing. By advancing spark timing, the engine may produce additional torque with inducting less air. Advancing the spark timing reduces the engine's torque reserve and may leave less engine torque available if an unanticipated torque is applied to the engine. Method 300 proceeds to 320 after engine spark timing is advanced.

At 320, method 300 judges if engine intake manifold vacuum is greater than the second threshold vacuum described at 312. If method 300 judges that engine intake manifold vacuum is greater than the second threshold vacuum, the answer is yes and method 300 proceeds to 328. Otherwise, the answer is no and method 300 proceeds to 322.

At 322, method 300 reduces the alternator load applied to the engine and electrical loads. By reducing loads applied to the engine, it may be possible to operate the engine at its desired speed with a lower engine air flow rate so that additional vacuum is produced. The alternator load may be removed from the engine via reducing a field current of the alternator. Method 300 proceeds to 324 after the alternator and electrical loads are reduced.

At 324, method 300 judges if engine intake manifold vacuum is greater than the second threshold vacuum described at 346. If method 300 judges that engine intake manifold vacuum is greater than the second threshold vacuum, the answer is yes and method 300 proceeds to 328. Otherwise, the answer is no and method 300 proceeds to 326.

At 326, method 300 sheds ancillary engine loads to reduce torque applied to the engine so that the engine may continue to operate at its desired speed (e.g., idle speed). Ancillary engine loads may include but are not limited to power take off devices, air conditioner compressor, and other engine load. Method 300 proceeds to 328 after engine loads are shed.

At 328, method 300 draws air from the vacuum reservoir into the engine to increase vacuum in the vacuum reservoir. In system configurations where a check valve is placed between the engine intake manifold and the vacuum reservoir, the check valve may open automatically when vacuum in the engine intake manifold exceeds vacuum in the vacuum reservoir. Method 300 proceeds to exit after air is drawn from the vacuum reservoir to the engine intake manifold.

In this way, method 300 provides different ways of generating vacuum depending on altitude at which the vehicle operates. In this example, richening the engine air-fuel ratio in response to a request for vacuum is only performed at higher altitudes. However, in some examples, the engine air-fuel ratio may be richened at lower altitudes in response to a request to increase vacuum.

Thus, the method of FIGS. 3 and 4 provides for a method for operating an engine, comprising: operating an engine at idle speed with a homogeneous air-fuel mixture; and richening the homogeneous air-fuel mixture and reducing an engine air flow amount to maintain the engine at idle speed in response to a request for vacuum. The method includes where the homogeneous air-fuel mixture is a stoichiometric air-fuel ratio when a vacuum request is not present. The method includes where richening the homogeneous air-fuel ratio includes richening the homogeneous air-fuel ratio to at least 0.8 lambda.

In some examples, the method includes where richening the homogeneous air-fuel ratio is not performed when ambient barometric pressure is greater than a threshold pressure and where richening the homogeneous air-fuel ratio is performed when ambient barometric pressure is not greater than the threshold pressure. The method includes where richening the homogeneous air-fuel ratio is not performed when the engine is operated at an altitude less than a threshold altitude and where richening the homogeneous air-fuel ratio is performed when engine is operated at an altitude greater than the threshold altitude. The method further comprises drawing air from a vacuum storage reservoir into the engine while the engine is operating with the richened homogeneous air-fuel ratio. The method further comprises supplying a rich homogeneous air-fuel mixture to the engine in response to the request for vacuum when the engine is not operating at idle and supplying a stoichiometric homogeneous air-fuel mixture to the engine in absence of the request for vacuum.

The method of FIGS. 3 and 4 also provides for operating an engine, comprising: advancing intake valve closing timing, advancing spark timing, and richening an air-fuel mixture supplied to the engine in response to a vacuum request and an engine intake manifold vacuum not being less than a threshold vacuum; and richening the air-fuel mixture supplied to the engine, not advancing intake valve closing timing, and not advancing spark timing in response to the vacuum request and the engine intake manifold vacuum being within a threshold vacuum level of the threshold vacuum. The method includes where richening the air-fuel ratio includes richening the air-fuel ratio to a richer air-fuel ratio than 0.8 lambda.

In some examples, the method includes where the intake valve closing timing is advanced before advancing spark timing. The method includes where spark timing is advanced before richening the air-fuel ratio. The method further comprises biasing a catalyst lean in response to the vacuum request. The method further comprises biasing the air-fuel mixture supplied to the engine lean in response to engine torque being greater than a threshold torque. The method further comprises not richening the air-fuel mixture supplied to the engine in response to ambient barometric pressure being greater than a threshold.

As will be appreciated by one of ordinary skill in the art, routines described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
 operating the engine at idle speed with a homogeneous air-fuel mixture;
 generating a vacuum request while operating the engine at the idle speed; and
 richening the homogeneous air-fuel mixture and reducing an engine air flow amount to maintain the engine at idle speed in response to the vacuum request.

2. The method of claim 1, where the homogeneous air-fuel mixture is a stoichiometric air-fuel ratio when a vacuum request is not present, where the vacuum request is based on a sensed vacuum level of a vacuum reservoir external to the engine and an engine air intake, where the vacuum reservoir is in pneumatic communication with a brake booster, and where the richening of the homogeneous air-fuel mixture is performed when engine load is less than a threshold engine load.

3. The method of claim 1, where richening the homogeneous air-fuel mixture includes richening the homogeneous air-fuel mixture to at least 0.8 lambda, and further comprising advancing intake valve closing in response to engine torque less than a threshold and a vacuum request generated above an altitude greater than a threshold altitude, then advancing spark timing in response to intake manifold vacuum less than a threshold vacuum, then richening an air-fuel ratio of the engine in response to intake manifold vacuum being less than the threshold vacuum.

4. The method of claim 3, where richening the homogeneous air-fuel mixture is not performed when ambient barometric pressure is greater than a threshold pressure and where richening the homogeneous air-fuel mixture is performed when ambient barometric pressure is not greater than the threshold pressure.

5. The method of claim 1, where richening the homogeneous air-fuel mixture is not performed when the engine is operated at an altitude less than a threshold altitude and where richening the homogeneous air-fuel mixture is performed when the engine is operated at an altitude greater than the threshold altitude.

6. The method of claim 1, further comprising drawing air from a vacuum reservoir into the engine while the engine is operating with the richened homogeneous air-fuel mixture and biasing an engine air-fuel ratio lean in response to altitude greater than a threshold, vacuum reservoir vacuum less than a first threshold, engine intake manifold vacuum less than a second threshold, engine torque less than a threshold, and engine intake manifold vacuum not within a threshold of the second threshold.

7. The method of claim 1, further comprising supplying the richened homogeneous air-fuel mixture to the engine in response to the vacuum request when the engine is not operating at idle speed and supplying a stoichiometric homogeneous air-fuel mixture to the engine in absence of the vacuum request.

8. A method for operating an engine, comprising:
 generating a first vacuum request;
 advancing cam driven intake valve closing timing, advancing spark timing, and richening an air-fuel mixture supplied to the engine in response to the first vacuum request;
 generating a second vacuum request; and
 richening the air-fuel mixture supplied to the engine, not advancing cam driven intake valve closing timing, and not advancing spark timing in response to the second vacuum request.

9. The method of claim 8, where richening the air-fuel mixture includes richening the air-fuel mixture to a richer air-fuel ratio than 0.8 lambda, and further comprising:
 biasing an engine air-fuel ratio lean in response to altitude greater than a threshold, vacuum reservoir vacuum less than a first threshold, engine intake manifold vacuum less than a second threshold, engine torque less than a threshold, and engine intake manifold vacuum not within a threshold of the second threshold.

10. The method of claim 8, where the cam driven intake valve closing timing is advanced before advancing spark timing, where the first vacuum request and the second vacuum request are based on a vacuum level of a vacuum reservoir external to the engine, and where the vacuum reservoir is in pneumatic communication with a brake booster.

11. The method of claim 8, where spark timing is advanced before richening the air-fuel mixture, where the richening of the air-fuel mixture, not advancing cam driven intake valve closing timing, and not advancing spark timing is performed when engine load is less than a threshold engine load, and where the threshold engine load is an engine idle load.

12. The method of claim 8, where the first vacuum request occurs when an engine intake manifold vacuum is not less than a first threshold vacuum, and where the second vacuum request occurs when the engine intake manifold vacuum is within a second threshold vacuum level of the first threshold vacuum, and further comprising:
 biasing a catalyst lean when engine intake manifold vacuum is not within the second threshold vacuum level of the first threshold vacuum.

13. The method of claim 8, further comprising biasing the air-fuel mixture supplied to the engine lean in response to engine torque being greater than a threshold torque.

14. The method of claim 8, further comprising not richening the air-fuel mixture supplied to the engine in response to ambient barometric pressure being greater than a threshold.

15. A system for operating an engine, comprising:
 the engine;
 a vacuum reservoir external to the engine and including a vacuum sensor; and
 a controller including executable instructions stored in a non-transitory medium to operate the engine while a vacuum level of the vacuum reservoir is less than a threshold vacuum level with a rich air-fuel mixture supplied to the engine in response to the vacuum level of the vacuum reservoir being less than the threshold vacuum level.

16. The system of claim 15, further comprising:
an intake valve adjustment device coupled to the engine, additional instructions for advancing intake valve timing of a cam driven intake valve via the intake valve adjustment device in response to the vacuum level of the vacuum reservoir being less than the threshold vacuum level; and
additional instructions to richen the air-fuel mixture in response to the vacuum level of the vacuum reservoir when engine load is less than a threshold engine load, where the threshold engine load is an engine idle load.

17. The system of claim 15, further comprising:
an alternator coupled to the engine; and
additional instructions for reducing a load of the alternator applied to the engine in response to the vacuum level of the vacuum reservoir being less than the threshold vacuum level, and additional instructions to advance intake valve closing in response to engine torque less than a threshold and a vacuum request generated above an altitude greater than a threshold altitude, then advancing spark timing in response to intake manifold vacuum less than a threshold vacuum, then richening an air-fuel ratio of the engine in response to intake manifold vacuum being less than the threshold vacuum.

18. The system of claim 15, further comprising additional instructions for supplying a lean air-fuel ratio to the engine in response to a torque level of the engine being greater than a threshold while the vacuum level of the vacuum reservoir is less than the threshold vacuum level.

19. The system of claim 15, further comprising additional instructions for supplying a lean air-fuel ratio to the engine in response to an intake manifold vacuum being within a desired vacuum level of a threshold vacuum and a brake booster, the brake booster in pneumatic communication with the vacuum reservoir.

20. The system of claim 15, further comprising additional instructions to lean the air-fuel mixture to a stoichiometric air-fuel mixture in response to a state of a catalyst, and additional instructions to bias the air-fuel mixture lean in response to altitude greater than a threshold, the vacuum level of the vacuum reservoir being less than the threshold level, engine intake manifold vacuum less than a threshold, and engine torque less than a threshold.

* * * * *